(12) United States Patent
Moore

(10) Patent No.: US 12,718,961 B2
(45) Date of Patent: Aug. 25, 2026

(54) SYSTEM INCLUDING A BYPASS PIPE THAT ROUTES SOME SODIUM COOLANT FROM A PRIMARY PUMP DISCHARGE UPWARD TO SODIUM MEASURING INSTRUMENTS LOCATED NEAR A NUCLEAR REACTOR HEAD

(71) Applicant: TerraPower, LLC, Bellevue, WA (US)

(72) Inventor: Stephen Moore, Kirkland, WA (US)

(73) Assignee: TERRAPOWER, LLC, Bellevue, WA (US)

( * ) Notice: Subject to any disclaimer, the term of this patent is extended or adjusted under 35 U.S.C. 154(b) by 350 days.

(21) Appl. No.: 18/531,633

(22) Filed: Dec. 6, 2023

(65) Prior Publication Data

US 2024/0266084 A1 Aug. 8, 2024

Related U.S. Application Data

(60) Provisional application No. 63/443,684, filed on Feb. 6, 2023.

(51) Int. Cl.
*G21C 17/025* (2006.01)
*G01F 23/284* (2006.01)
(Continued)

(52) U.S. Cl.
CPC .......... *G21C 17/025* (2013.01); *G01F 23/284* (2013.01); *G21C 17/032* (2013.01); *G21C 17/035* (2013.01)

(58) Field of Classification Search
CPC .. G21C 17/025; G21C 17/032; G21C 17/035; G01F 23/284
(Continued)

(56) References Cited

U.S. PATENT DOCUMENTS 3,247,069 A * 4/1966 Powell ..................... G21D 3/14 376/247
3,672,209 A 6/1972 Roach et al.
(Continued)

FOREIGN PATENT DOCUMENTS

FR 3015665 A1 * 6/2015 ........... G21C 17/032
GB 2157879 A 10/1985

OTHER PUBLICATIONS

Melnikov, "Experimental study of using microwave reflex-radar level gauges for liquid metal coolants", Nuclear Energy and Technology 8, No. 3 (2022): 219-223. (Year: 2022).*
(Continued)

*Primary Examiner* — Jack W Keith
*Assistant Examiner* — Daniel Wasil
(74) *Attorney, Agent, or Firm* — FisherBroyles, LLP; Jeremy P. Sanders

(57) ABSTRACT

In a sodium fast reactor, a bypass pipe is fluidly coupled to the primary sodium pump discharge and diverts a portion of the primary sodium coolant to an instrument assembly. The bypass pipe routes flowing sodium upward toward the reactor head where it fluidly couples to the instrument assembly. The instrument assembly includes an instrument tank and selectively swappable instrument modules. The instrument modules can be configured to measure flow, pressure, temperature, and fluid level, among other things. The instrument assembly is located relatively close to the reactor head and close to the sodium level in the sodium pool and is accessible from above the reactor head for quick and efficient removal and replacement of the entire instrument assembly or individual instruments.

20 Claims, 9 Drawing Sheets

(51) Int. Cl.
*G21C 17/032* (2006.01)
*G21C 17/035* (2006.01)

(58) Field of Classification Search
USPC .......................................... 376/246, 247, 404
See application file for complete search history.

(56) References Cited

U.S. PATENT DOCUMENTS

| | | | | |
|---|---|---|---|---|
| 3,964,969 | A | | 6/1976 | Brynsvold et al. |
| 4,415,524 | A | | 11/1983 | Gross et al. |
| 4,613,478 | A | * | 9/1986 | Sharbaugh ........... G21C 11/088 376/404 |
| 2014/0341331 | A1 | | 11/2014 | Cheatham, III et al. |

OTHER PUBLICATIONS

International Application No. PCT/US2023/082785 International Search Report and Written Opinion dated Jul. 11, 2024.
Bridges et al., "A Liquid-Metal Reactor Core Demonstration Experiment Using HT-9", Nuclear Technology, American Nuclear Society, Jun. 1, 1993, vol. 102, No. 3, pp. 353-366, DOI: 10.13182/NT93-A17034, ISSN: 0029-5450, figures 1-3.
International Application No. PCT/US2023/082786 International Search Report mailed Jul. 19, 2024.

* cited by examiner

SYSTEM INCLUDING A BYPASS PIPE THAT ROUTES SOME SODIUM COOLANT FROM A PRIMARY PUMP DISCHARGE UPWARD TO SODIUM MEASURING INSTRUMENTS LOCATED NEAR A NUCLEAR REACTOR HEAD

GOVERNMENT LICENSE RIGHTS

This invention was made with government support under DOE Cooperative Agreement No. DE-NE0009054 awarded by the U.S. Department of Energy. The government has certain rights in the invention.

BACKGROUND

In a sodium-cooled fast reactor ("SFR"), the reactor components include a reactor vessel filled with a liquid sodium coolant and a reactor core. In some cases, an SFR is a once-through fast reactor that runs on subcritical reload fuel that is bred up and burned in situ. The reactor core is immersed in the sodium pool in the reactor vessel. In some designs, the core may include fuel pins bundled into fuel assemblies that contain fissile fuel and fertile fuel that may be bred up into fissile fuel. The primary sodium coolant flows through the reactor core, and through the fuel assemblies and around the fuel pins, thus drawing heat away from the fuel pins. As the coolant flow upward through the reactor core, it becomes heated and continues to flow upward out of the core to a hot pool. From the hot pool, the sodium coolant enters one or more heat exchangers and flows downward to the cold pool. In many cases, the sodium not only flows by natural circulation, which is caused by the heated sodium having a lower density and thus rises from the core and displaces colder sodium, which flows downwardly toward the cold pool. However, in addition to natural circulation, forced circulation (e.g., a pump) also causes the sodium to flow from the hot pool, through the heat exchanger and back to the cold pool.

In order to measure the temperature and flow of the sodium coolant through the primary sodium pump ("PSP"), discharge PSP instruments are mounted to the discharge of the PSP. Examples of these instruments typically include thermocouples to measure temperature and bellows or diaphragm-type pressure sensors to measure pressure and flow. However, in some typical sodium fast reactors, the discharge of the PSP is located approximately 40+ feet below the reactor head, which creates many challenges in maintenance and/or replacement of failed sensor components.

While a thermocouple could potentially be routed along the internals of the PSP and replace; however many other sensors, like the bellows-type pressure sensor could not be replaced without removal of the entire PSP.

Moreover, typical systems also require a Sodium-Potassium (NaK) capillary tube from the process connection bellows at the PSP discharge to the bellows above the reactor head, which is very difficult to fill as well as impractical to fabricate, and further, results in undesirable response times, such as on the order of thirty seconds or greater.

It would be advantageous if the temperature, pressure and/or flow could be measured by instruments that are much easier to maintain and replace without the necessity to remove the entire PSP in order to do so. Moreover, a system that allows improved response times would also provide more immediate feedback to reactor operators to ensure smooth and reliable operation of the nuclear reactor.

These, and other features and advantages will become apparent to those of skill in the art by reference to the following figures and description.

SUMMARY

A system for measuring sodium in a sodium fast reactor includes a primary sodium pump configured to circulate primary sodium coolant within a reactor vessel, the primary sodium pump having a discharge; a bypass pipe fluidly coupled to the discharge at a first bypass end and having a second bypass end; an instrument tank coupled to a reactor head at a first instrument tank end and having a second instrument tank end open to a pool of sodium; and an instrument module insertable through an aperture in the reactor head into the instrument tank and selectively coupled to the second bypass end at a coupling, the instrument module comprising one or more instruments configured to measure a characteristic of sodium within the bypass pipe. The instrument tank may additionally have holes near the first instrument tank end, such as for allowing fluid communication between the interior of the instrument tank and a primary cover gas area.

In some embodiments, the instrument module comprises one or more of a temperature sensor, a pressure sensor, a flow sensor, and a fluid level sensor. The pressure sensor may include a low-range pressure sensor and may be configured to measure a sodium flow rate at a reactor power of up to 20%.

In some examples, the pressure sensor includes a high-range pressure sensor, the high-range pressure sensor configured to measure a sodium flow rate at a reactor power of greater than 20%.

In some cases, the coupling is a slip-on coupling with the instrument assembly fitting over the second bypass end. The slip-on coupling may further include an annular ridge on an inside surface of the instrument assembly that seals against an outside surface of the second bypass end. In some cases, instrument assembly fits within the second bypass end.

The instrument assembly may include a mounting flange at an upper end, the mounting flange configured to mount to the reactor head. In some cases, the instrument module is removable from the reactor vessel through the aperture in the reactor head. For example, the flange may be disconnected, and a crane may lift he instrument module out of the reactor vessel.

In some cases, the characteristic of the sodium within the bypass pipe includes one or more of temperature, pressure, flow rate, and fluid level.

In some embodiments, the bypass pipe is located within the primary sodium pump. The instrument tank may also be located within the primary sodium pump. In other cases, the bypass pipe is located outside the primary sodium pump.

A bypass elbow may be located on the instrument module and be configured to discharge sodium from the instrument module. The bypass elbow may direct sodium to exit the instrument module and flow within the instrument tank.

In some examples, the instrument module is located within 15 feet of the reactor head. This may facilitate easier accessibility and removal of the instrument module. The instrument module may be at least partially submerged in sodium. The instrument module may be configured to be replaced during reactor operation in some cases, such as lower power reactor operation, or during refueling, or scheduling down time.

In some instances, the characteristic of the sodium is fluid level, and the instrument comprises one or more of a radar level detector, an inductive probe, or other suitable fluid level sensor.

The instrument module may include an opening in the instrument module to allow gas to exit therefrom and to enter the cover space in the reactor vessel above the sodium pool.

BRIEF DESCRIPTION OF THE DRAWINGS

The accompanying drawings are part of the disclosure and are incorporated into the present specification. The drawings illustrate examples of embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

The following drawing figures, which form a part of this application, are illustrative of described technology and are not meant to limit the scope of the technology as claimed in any manner, which scope shall be based on the claims appended hereto.

DETAILED DESCRIPTION

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

Figure 1:
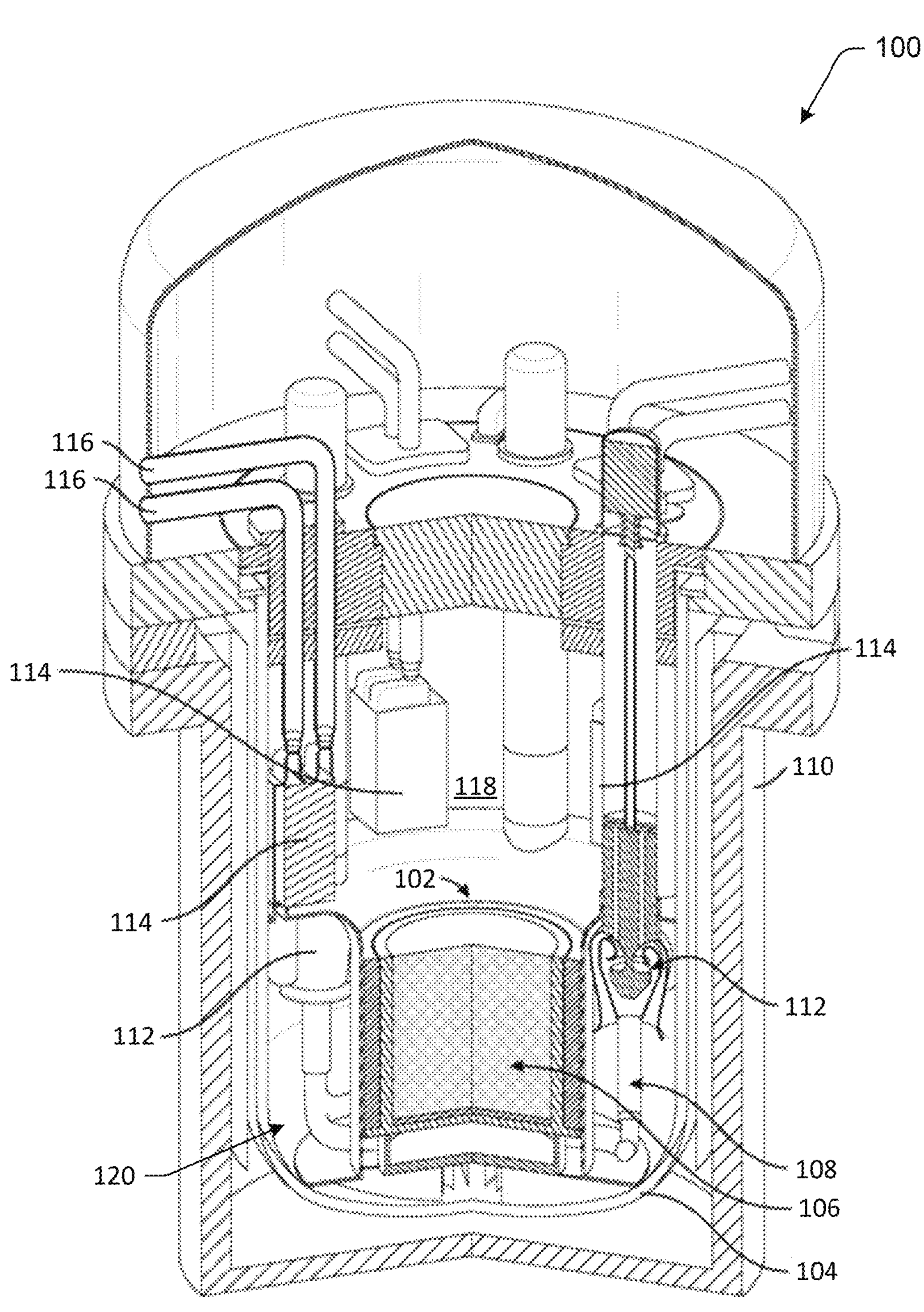
FIG. 1 illustrates a partial cutaway perspective view of a nuclear fission reactor, in accordance with some embodiments.

FIG. 1 illustrates a fission reactor and reactor core as a non-limiting overview and not by way of limitation. As shown, nuclear fission reactor 100 includes a nuclear fission reactor core 102 disposed in a reactor vessel 104. According to some embodiments, nuclear fission reactor core 102 contains nuclear fuel within a central core region 106. Nuclear fission reactor core 102 may include fuel assemblies, and reactivity control assemblies. According to some embodiments, an in-vessel handling system (not shown) is configured to shuffle ones of the nuclear fuel assemblies. Nuclear fission reactor 100 may also include a reactor coolant system 108.

In some implementations, the nuclear fission reactor 100 is based on elements of liquid metal-cooled, fast reactor technology. For example, in various embodiments the reactor coolant system 108 includes a pool of liquid sodium disposed in the reactor vessel 104. In such cases, the nuclear fission reactor core 102 is submerged in the pool of sodium coolant in the reactor vessel 104. The reactor vessel 104 may be surrounded by a containment vessel 110 that helps prevent loss of sodium coolant in the unlikely case of a leak from the reactor vessel 104.

In various embodiments, the reactor coolant system 108 includes a reactor coolant pump 112, such as a primary sodium pump (PSP) 112. The reactor coolant system 108 may include one pump, two pumps, or any suitable number of PSPs 112. In addition, the pumps may be any suitable pump as desired (e.g., mechanical, electromechanical, electromagnetic, induction, etc.).

The reactor coolant system 108 may include one or more heat exchangers 114. Heat exchangers 114 may be disposed in the pool of liquid sodium and may draw in heated liquid sodium into a first side of the heat exchanger 114. In some embodiments, heat exchangers 114 have non-radioactive intermediate coolant on the other side of heat exchangers 114. The intermediate coolant may be sodium, or some other working fluid. To that end, heat exchangers 114 may be considered intermediate heat exchangers.

The PSP 112 may be configured to circulate primary sodium coolant through the nuclear fission reactor core 102. In some embodiments, the pumped primary sodium coolant exits the nuclear fission reactor core 102 at a top of the nuclear fission reactor core 102 into a hot pool 118 and passes through one side of the heat exchangers 114. In some embodiments, a second working fluid is circulated via an intermediate coolant loop 116 outside the containment vessel 110, such as to a steam generator, to a thermal storage system, or may be circulated to heat exchangers for still another use. The intermediate coolant may be any suitable coolant, such as sodium, salt, or another working fluid and may include a phase change medium. After passing through the heat exchangers 114, the primary sodium returns to a lower end of the containment vessel, to a cold pool 120 where it may be drawn back through the reactor core 102 to complete the primary coolant loop.

In some cases, the primary coolant loop uses forced circulation, such as by one or more pumps, and may also use natural circulation due to the density difference of the heated and cooled sodium.

One of the difficulties in managing and operating a sodium-cooled fast reactor ("SFR") is the instrumentation required to accurately measure volumetric flow and temperature of the sodium through the PSP 112. Historically, methods for measuring temperature and flow used discharge PSP instruments mounted to the outlet of the PSP, such as thermocouples and bellows-type sensors, which were mounted directly to the discharge of the PSP. However, the bellows to the discharge pump is not serviceable or replaceable without removing the entire PSP from the reactor vessel. Typically, in some large pool type SFRs, the PSP discharge is located in excess of 40 feet below the reactor head and submerged in radioactive sodium coolant.

Furthermore, the measurement of primary sodium flow from typical SFR PSPs relies on pump discharge pressure, which may have a full-scale error of 0.5% or more, which can result in an unacceptable error, particularly when measuring low flows due, in part, to the system curve in which pressure is exponential to flow rate.

According to the described embodiments, a system is described that allows accurate measurements, even at low flow rates, positions the PSP sensors much closer to the reactor head, and is easily serviceable and replaceable without removing the PSP from the reactor vessel. According to some embodiments, a bypass pipe is attached to the discharge of the PSP and routes some of the PSP discharge flow upward to the cold pool into an instrument tank where instruments are located.

Figure 2:
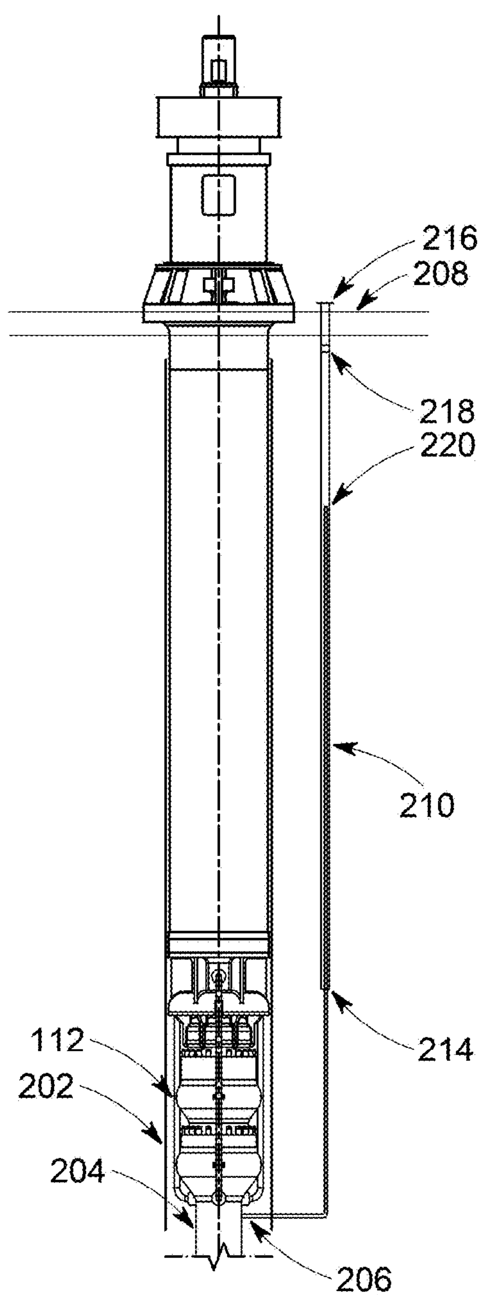
FIG. 2 is a cutaway view of a primary sodium pump and instrument tank, in accordance with some embodiments.

FIG. 2 illustrates a cutaway view of a primary sodium pump and an instrument tank. The PSP 112 may be positioned within a PSP tank 202. The PSP tank may be a conduit that is open at the bottom to the hot pool and encloses the PSP 112. The pump tank 202 may additionally have one or more openings at an upper end, which may be located above the level of the sodium to allow access to the cover space within the reactor vessel. The PSP 112 may be in fluid communication with one or more heat exchangers and may pull fluid from the hot pool and through the heat exchanger. The PSP discharge 204 is located at the lower end of the PSP 112 and is configured to output cooled sodium to the reactor core. In some cases, the PSP discharge 204 includes conduits that route the discharged sodium to the inlet plenum below the reactor core.

According to some embodiments, a bypass pipe 206 is coupled to the PSP discharge 204 and directs some of the sodium from the PSP discharge 204 through the bypass pipe 206. The bypass pipe 206 may extend upwardly toward the reactor head 208. In some cases, the bypass pipe 206 may enter an instrument tank 210. The instrument tank 210 may be a pipe, tube, conduit, or other such structure that allows an instrument assembly to be inserted therein. As used herein, the terms "instrument module" and "instrument assembly" are used interchangeably and refer to one or more instruments that may be selectively inserted into the instrument tank through the reactor head. The instrument module may be inserted or removed from the reactor vessel as a module and all the installed instruments may be inserted or removed together. The instrument tank may have a lower end 214 that is open to the sodium pool. In some cases, the instrument tank 210 allows sodium from within the instrument tank 210 to drain downwardly back into the sodium pool.

The instrument tank may further extend through the reactor head 208 and may include a flange 216 that allows the instrument tank 210 to be mounted to the reactor head 208 and/or gripped for withdrawal of the instrument tank 210 from the reactor vessel. The instrument tank 210 may further include one or more apertures 218 that allow any gas within the instrument tank to escape into the cover gas area above the sodium pool.

The bypass pipe 206 has a first end that is connected to the PSP discharge 204 and a second end that is disposed within the instrument tank. The second end may include a seal 220 that engages with the instrument assembly and may provide a fluid tight seal between the bypass pipe and the instrument assembly. The seal 220 may be any suitable seal, and may include a gasket, washer, compressible seal, O-ring, or other suitable type of seal.

In some cases, the instrument tank lower end 214 terminates below the sodium level within the reactor vessel. In some cases, this creates a siphon, such that by slowly ramping up the pump the bypass pipe and instrument tank are primed with sodium, which wets the pressure connection. Once the bypass pipe 206 and instrument tank are primed, the pump keeps the bypass filled by virtue of its normal operation. However, at low flows, such as below about 20%, the level in the bypass would have a tendency to fall; however, the siphon effect would maintain an appropriate sodium level within the bypass pipe. In these examples, the sodium level within the bypass pipe is always maintained, and separate level measuring instruments may not be required, as the sodium level in the bypass pipe can be determined based on readings from the pressure instruments.

Figure 3:
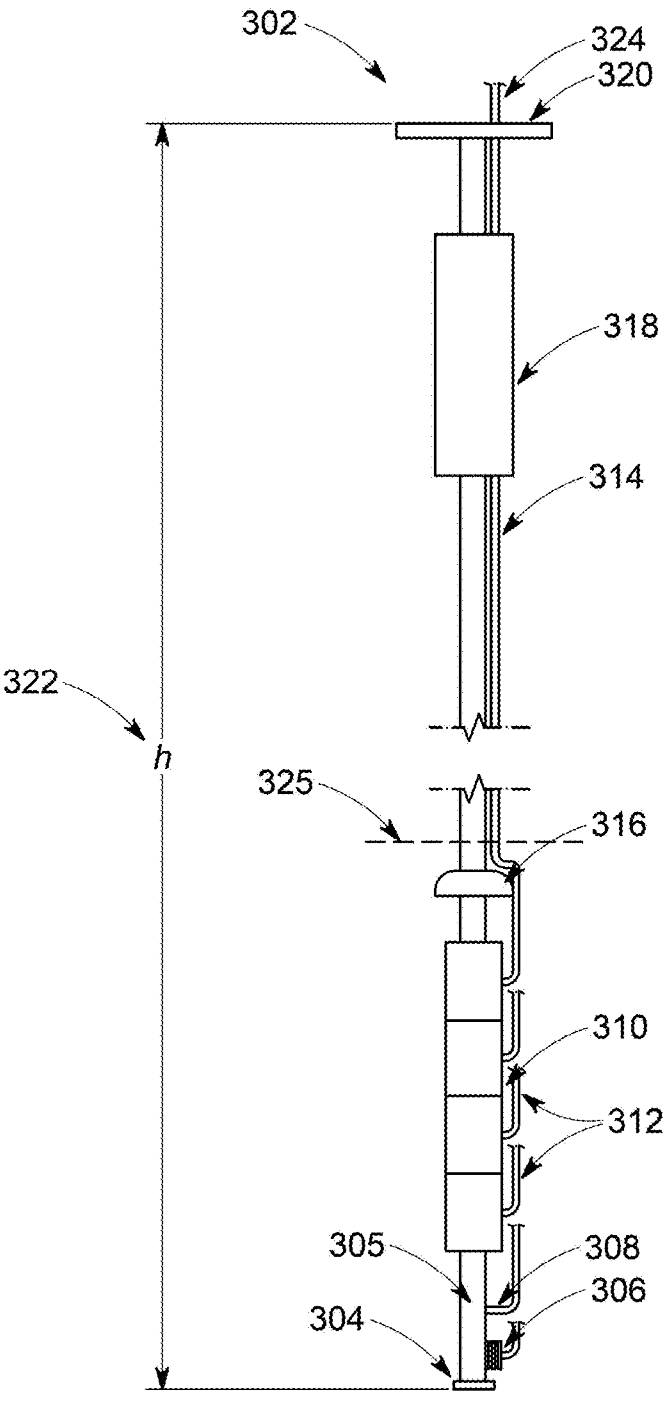
FIG. 3 is a schematic illustration of a PSP instrument module showing discharge instruments, in accordance with some embodiments.
Figure 4:
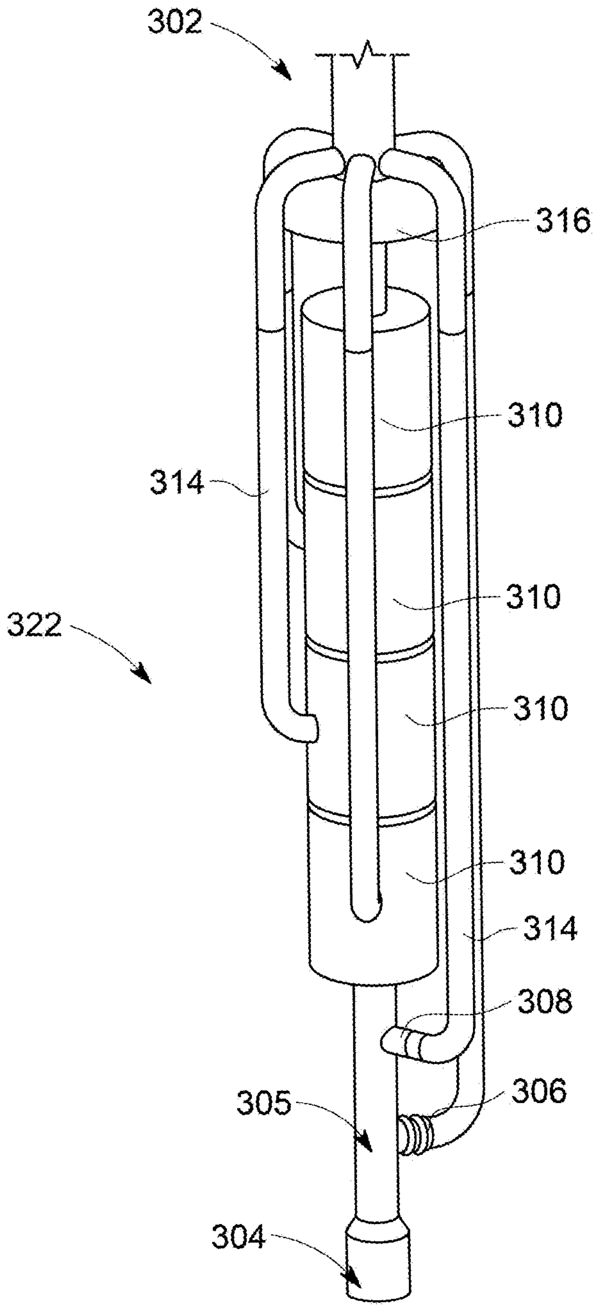
FIG. 4 is a perspective view of a PSP instrument module showing a flow measurement module.

With additional reference to FIGS. 3 and 4, the instrument assembly 302 may be inserted into the instrument tank 210 and may be configured for flow measurement. The instrument assembly 302 may include a coupling 304 at a lower end which may be configured for connecting with the bypass pipe 206 second end to form a fluid tight seal therewith. In some cases, the instrument assembly includes a modular bypass pipe 305 that provides a conduit for sodium to flow therethrough. The modular bypass pipe 305 may connect to the bypass pipe 206 (which in some cases, is permanently mounted to the PSP) with a push-on seal, thus allowing a fluid tight, selectively removable, connection with the bypass pipe, which may be permanently installed within the reactor vessel.

According to some embodiments, one or more sensors may be disposed along the length of the instrument assembly 302 for detecting, measuring, and determining data regarding the sodium exiting the PSP. For example, one or more pressure sensors 306 may be included for measuring the pressure of the sodium flowing within the modular bypass pipe 305, which may then be correlated with flow rate. The instrument assembly 302 may be partially, or entirely, submerged in sodium. This is at least in part due to the instrument tank being open to the cold sodium pool and the sodium level is allowed to enter the instrument tank.

One or more thermocouples 308 may similarly be disposed along the instrument assembly 302. In use, the thermocouples 308 and pressure sensors 306 are configured to measure the discharge temperature and pressure of the PSP. The pressure measurement may be corrected for the static head difference between the location of the pressure sensor 306 and the bypass connection with the PSP discharge.

Additional instruments, such as one or more flowmeters 310, and other instruments e may be selectively placed along the instrument assembly 302 to obtain other measurements, as desired, and additional instrument conduits 314 may be provided that allow access to the instrument assembly for selectively attaching other instruments.

A bypass elbow 316 may be disposed along the instrument assembly 302, and may be located above the instruments, and can be configured to discharge flowing sodium from flowing upwardly through the instrument assembly 302 to the instrument tank. Once discharged to the instrument tank, the sodium is free to enter the sodium pool. In some cases, the bypass elbow 316 is an annular shape and may seal the instrument assembly against the inner surface of the instrument tank. Above the bypass elbow 316, support piping may provide structural support and shielding 318 may be provided near the reactor head. In some cases, the bypass elbow 316 is configured to not seal against the inner surface of the instrument tank which may allow fluid communication with the cover gas in the instrument tank. In some cases, the bypass discharge is located below the lowest cold pool level 325. In this case, the instruments can be disposed higher up on the module and once the bypass pipe is primed with sodium, the sodium level can be measured by pressure and/or temperature.

A PSP discharge instruments flange 320 may be disposed at an upper end of the instrument assembly 302 and provide a mount for securing the instrument assembly to the reactor head and/or to the instrument tank. In some examples, the PSP discharge instruments flange 320 is positioned above the reactor head and thus allows access to the instrument assembly 302 from above the reactor vessel. In some cases, the instrument assembly 302 can be removed from the reactor vessel by disconnecting the PSP discharge instruments flange 320 and withdrawing the instrument assembly 302 from the instrument tank, such as with an overhead crane. In this way, the instrument assembly 302 can be withdrawn from the reactor vessel, such as for maintenance, for replacement, or otherwise.

In some cases, the instrument assembly 302 has a height h 322. In some cases, the height 322 is significantly smaller than a height of the PSP. With other reactor designs, the instruments are typically located at the discharge of the PSP, which may be on the order of 40 feet or more below the reactor head. In some embodiments, the height 322, and thus the maximum distance the instruments are located below the reactor head, is about 20 feet, or 18 feet, or 15 feet, or 13 feet, or 10 feet or less. In this way, the instrument assembly 302 is much easier to access and maintain, which can be done without removing the PSP from the reactor vessel. Furthermore, the cabling for the instruments assembly 302 is also much shorter. The cabling may exit the reactor vessel through the reactor head by an instrument conduits out aperture 324 that provides a passageway for the instrumentation cabling to be routed out of the reactor vessel.

In some embodiments, an instrument assembly 302 could be configured to measure the bypass flow using magnetic flowmeters. The bypass elbow 316 may be located below the sodium level in the instrument tank, so that as the pump begins operation bypass flow will be detectable from the flowmeters, even at low flow rates. IN some cases, the bypass elbow 316 may be located above the sodium level; and the bypass pipe may be configured to discharge below the sodium level so that the bypass can be primed and maintain a siphon within the bypass pipe to keep the sodium at an acceptable level within the bypass pipe.

The flow meters may include a sealed permanent magnet, a thermocouple attached to the magnet, and electrodes attached to the pipe. When the system is utilized in a SFR, the flowing sodium produces a voltage in the magnetic field that is proportional to its velocity. In some cases, a single instrument conduit 314 may be provided for each magnetic flow meter. Similarly, a single instrument conduit may be provided for each pressure sensor, and likewise, for each thermocouple. In some cases, the flow through the bypass pipe may be used to calculate primary sodium flow for all flow regimes, and the pressure instruments may supplement the flow data from the flow meters, especially at higher range flow regimes. In some cases, Eddy current flow meters may be used in addition to, or alternative to, magnetic flow sensors.

Figure 5:
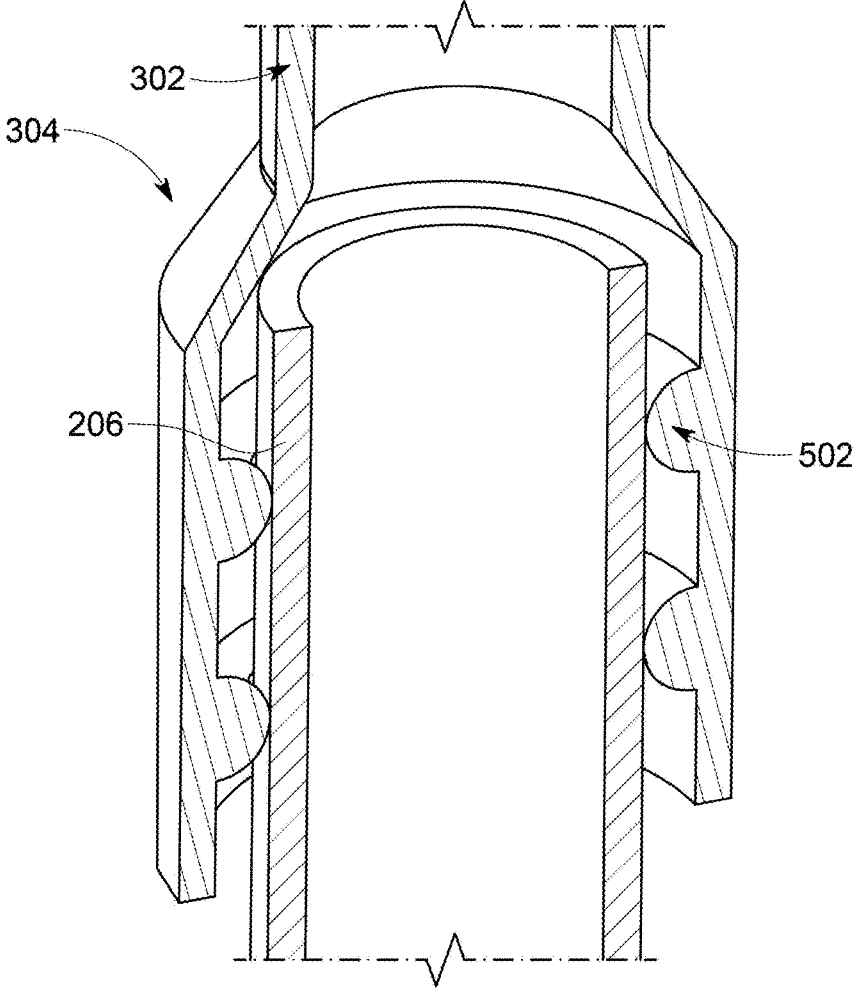
FIG. 5 is a partial cutaway view showing the coupling and seal between an instrument module and a bypass pipe.

FIG. 5 illustrates details of one embodiment of a push on coupling 304 between the instrument assembly 302 and the bypass pipe 206. The coupling 304 may include one or more annular ridges 502 that contact the bypass pipe 206 and create a seal therewith. In some cases, the seal is fluid-tight such that the flow from the bypass pipe 206 is forced through the instrument assembly 302 and the instruments attached thereto. The seal may be a metal-on-metal seal and in some cases, is integrally formed with the components. In some cases, the ridges 502 may be formed on the outer surface of the bypass pipe 206, while in other cases, may be formed on the inner surface of the coupling 304. The ridges 502 may alternatively be a separate component that is attached to one of the instrument assembly 302 or the bypass pipe 206. In some cases, the ridges 502 may be formed of a different material than the instrument assembly 302 or the bypass pipe 206, and in some cases, may be formed of a material that has a higher lubricity than the instrument assembly 302 or the bypass pipe 206 material and may provide a reduced friction as the coupling 304 engages the bypass pipe 206. It should be apparent that, while the description describes the instrument module fitting over the bypass pipe, the configuration could be the opposite—the instrument module could be configured to fit inside the bypass pipe while still realizing the same benefits the described configurations.

According to some embodiments, the instrument assembly 302 may be a module configured for flow measurement. The differential head from the discharge of the PSP through the bypass to the sodium surface in the instrument tank and from the discharge of the PSP through the core to the surface of the hot pool may be assumed to be the same. Through testing the bypass assembly for flow and differential pressure, the equivalent differential pressure through the core for a measured flow can be determined. The core assembly can be tested, and the differential pressure can be correlated to a flow rate. In some cases, this allows for direct measurement of bypass flow, which may result in higher accuracy than simply measuring sodium level or pressure and correlating these measurements to flow rates.

In some embodiments, a pump curve is used to correlate actual flow. For example, the differential head or pressure of the pump at the pump tank inlet level versus the PSP discharge level (e.g., for low flows) or at the PSP discharge pressure (e.g., for high flows). Using the pump curve in combination with these measurements can be used to determine an accurate flow rate. In addition, over time, as the pumps age the pump curve may change its accuracy. In some cases, the pump curve may be updated such as by comparing the pump curve to a test pump or performing calorimetric calculations with the intermediate heat exchanger and intermediate sodium flowmeters and/or thermocouples. In other words, the flow rate may be determined based, at least in part, on the pump curve. As used herein, a pump curve is a graph that plots flow vs head pressure. The curve typically begins at zero flow and static head pressure and descends until it reaches the pump runout or maximum flow rate. By utilizing the pump curve and measuring the head pressure differential, a flow rate may be determined and used with embodiments described herein.

Figure 6:
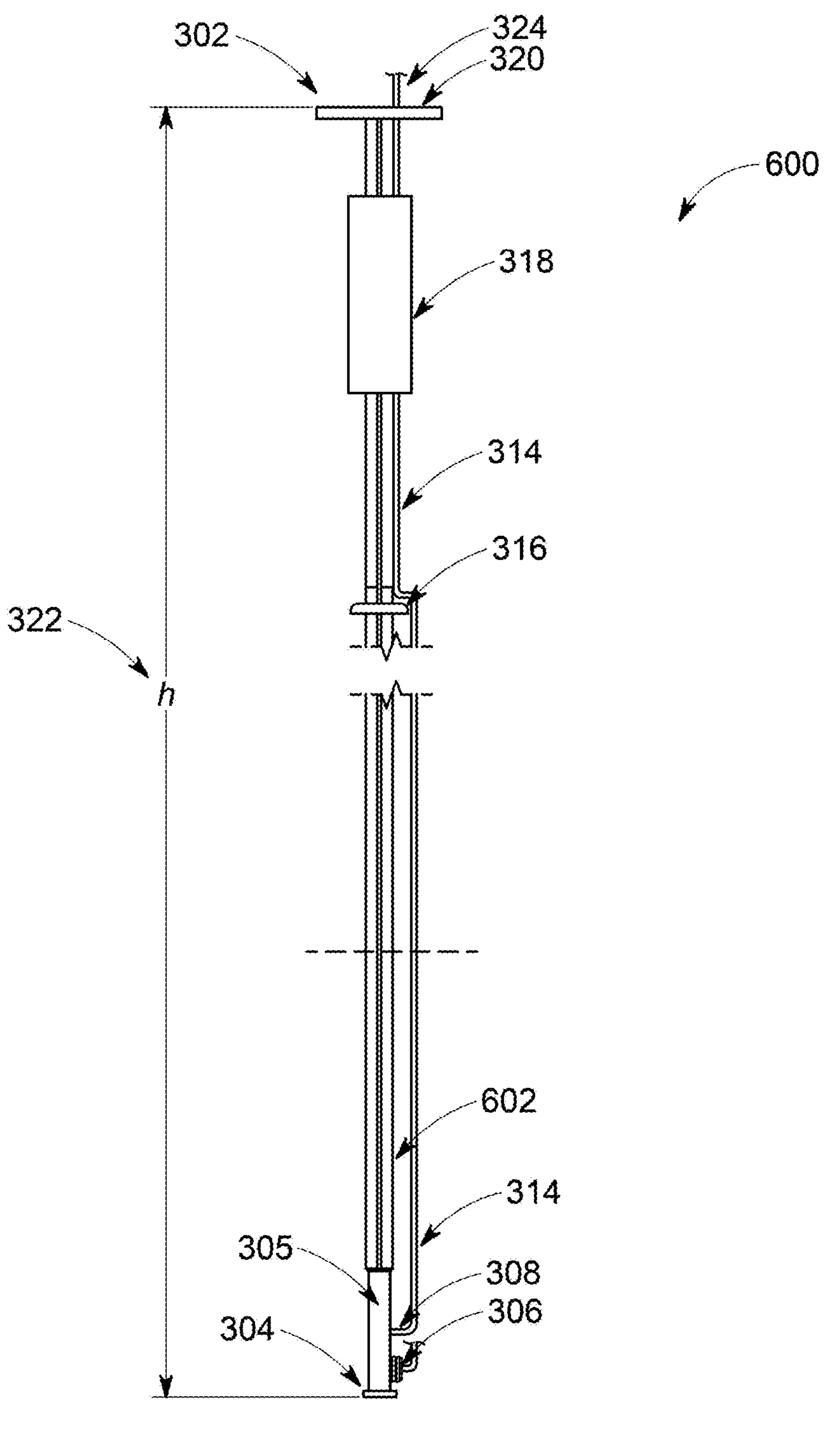
FIG. 6 is a schematic illustration of a PSP instrument module showing discharge instruments, including a level sensing manifold, in accordance with some embodiments.

FIG. 6 illustrates an instrument assembly 302 configured for primary sodium coolant level measurements. According to some embodiments, the instrument assembly 302 is modular and different modules can be swapped out depending on the types of measurements that are desired. As illustrated, a level sensing module 600 can be inserted into the instrument assembly 302. In some cases, multiple modules can be installed simultaneously by locating multiple instrument assemblies 302 at different instrument tanks installed within the reactor vessel. Of course, additional bypass pipes may also be installed to provide additional locations for the instrument assembly modules to be located throughout the reactor. The instrument assembly 302 may have a connection seal 304 at a lower end which may be configured to engage with an upper end of the bypass pipe to allow fluid communication from the bypass pipe to the instrument assembly 302. In some cases, one or more pressure transducers 306 are provided to measure a primary sodium coolant pressure coming from the PSP. In addition, one or more temperature sensors 308 (e.g., thermocouples) may be provided to measure the temperature of the sodium as it is discharged from the PSP. Each of these sensors may have an instrument conduit 314 that extends to a location above the reactor head. In some cases, each measurement sensors has its own unique instrument conduit, although in some cases, more than one instrument may share an instrument conduit for cabling runs.

A level sensing manifold 602 may be configured to determine the level of the sodium pool within the reactor vessel. For example, the bypass pipe may be bifurcated into multiple level sensing pipes. The bypass elbow 316 may have level detection ducting attached through it which may be from above the reactor head, through which level detecting sensors may be routed. In some cases, the level detecting sensors may be any suitable level detector, such as, without limitation, radar level detectors, inductive probes, load cells, radio frequency capacitive level transmitters, ultrasonic level transmitters, float level sensors, among others.

In use, without the PSP operating, the level sensing manifold 602 may be partially submerged in the sodium pool, which would indicate the cold pool level. As the pump begins operation, the level in the level sensing manifold 602 would raise. Small changes in primary sodium flow will result in measurable changes of level (e.g., a 1% change in overall primary flow 5-15% may result in about 2 in. to 6 in. of sodium level rise in the level sensing manifold 602). The level, along with other reactor instrumentation signals (e.g., sodium temperature to determine sodium densities throughout the reactor, hot pool level to allow differential head calculation of the reactor core), would allow for accurate primary flow measurements even in a low-flow regime. The described embodiments may additionally provide a loss of flow signal for the pumps at low flow regimes. Once the primary sodium flow reaches a certain point, the sodium may overflow from the bypass pipe and into the instrument tank, and level measurement may no longer be possible, and other instrumentation may be relied upon, such as discharge PSP pressure, for example, to determine primary sodium flow.

The instrument assembly 302, as with other embodiments, may have a height h 322, that may be shorter than the height of the reactor vessel and may be shorter than the length of the PSP. In some cases, the height of the instrument assembly 302 is less than 50% of the height of the reactor vessel, or less than 40%, or less than 30%, or less than 20%, or less than 10%, or less than 5% of the height of the reactor vessel. In some cases, this places the entire instrument assembly within the upper half, or upper third, or upper quarter of the reactor vessel. By disposing the instrument assembly 302 nearer the reactor vessel head than typical reactor configurations, maintenance on the instrument assembly 302 is much more efficient. Furthermore, feedback from the instrument assembly is quicker and allows an automated system and/or an operator to take action more quickly to ensure a smooth and efficient running reactor.

Figure 7:
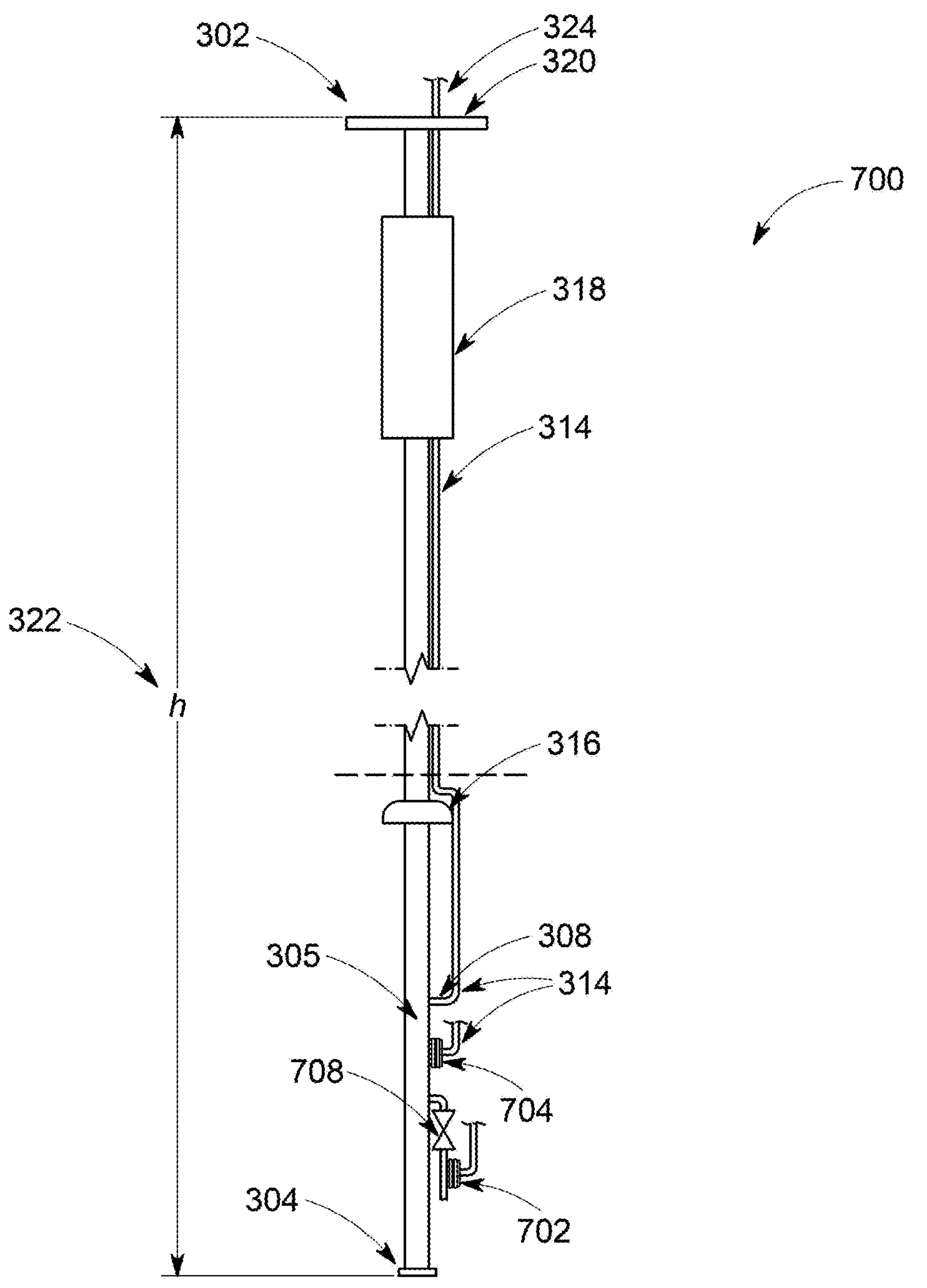
FIG. 7 is a schematic illustration of a PSP instrument module, including a low range pressure assembly and a high range pressure assembly, in accordance with some embodiments.

FIG. 7 illustrates another embodiment of an instrument assembly 302 that utilizes an instrument module configured as a pressure module 700. The pressure module 700 may share many components of other embodiments, such as the instrument assembly connection 304 that allows a fluid connection to the bypass pipe from the PSP discharge. A bypass elbow 316 may direct flowing sodium discharged from the instrument assembly 302 back to the instrument tank and the sodium pool. One or more instrument conduits 314 may provide a cable run for connecting instruments to a location above the vessel head through the instrument conduits out aperture 324.

A low range pressure assembly 702 may be provided to determine accurate pressure, even in a low-pressure operating state. In some cases, the instrument assembly 302 up to and including the bypass elbow 316 may be submerged in the sodium pool. A plurality of pressure sensors may be used, such as one or more high range pressure sensors 704 (e.g., for 20%-100% flow) and another one or more low range pressure sensors 702 (e.g., 5%-20% flow). In some cases, the low range pressure sensors 702 will have significantly better accuracy at low flow rates. The low range pressure sensors 702 may include an isolation valve 708 which can be configured to shut off and separate the low range pressure sensors 702 during higher power and higher flow rates. The isolation valve 708 may be electrically actuated, or in some cases may be pressure actuated such that higher flows automatically actuate the isolation valves 708 to bypass the low range pressure sensors 702 and utilize the high range pressure sensors in response to the high flow range. In some cases, the low range pressure sensors 702 may be more delicate, thus providing the ability to isolate the low range pressure sensors 702 protects the instruments while allowing accurate measurements at low flow rates.

While the illustrated and described embodiments show that the instrument tank is located external to the PSP, in some embodiments, the instrument tank may be positioned within the PSP and therefore, the instrument assemblies can be located within the instrument tank that is inside the PSP. The bypass pipe may still receive flow from the discharge of the PSP, and route that flow through the instrument assemblies that are located inside the PSP in order to determine measurements without occupying space outside the PSP.

Figure 8:
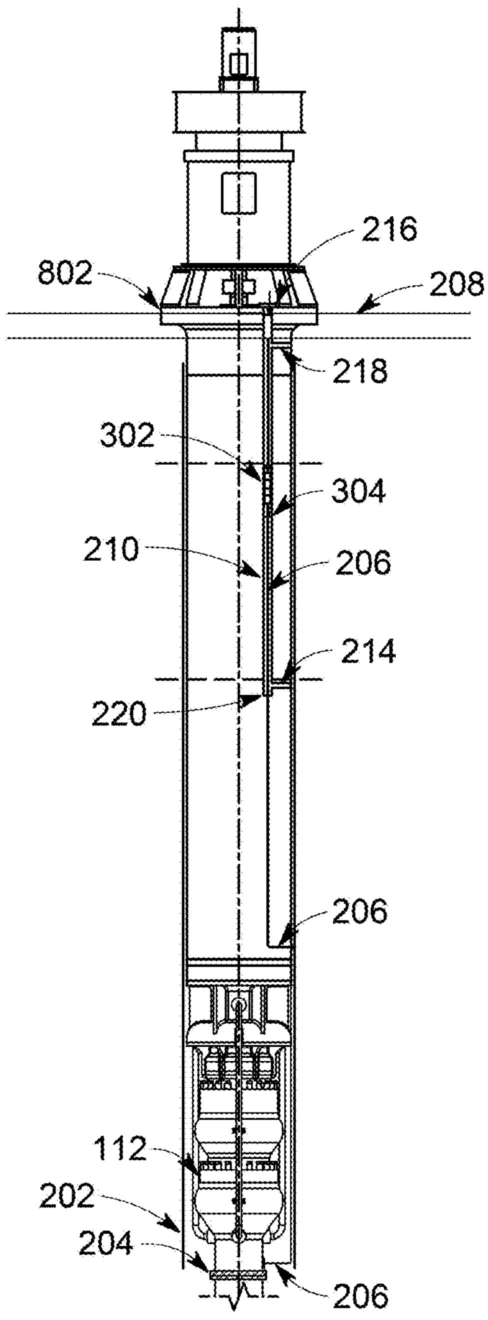
FIG. 8 is a schematic illustration of a PSP instrument module showing discharge instruments and a bypass pipe disposed inside the PSP tank, in accordance with some embodiments.

For example, as illustrated in FIG. 8, according to some embodiments, the instrument tank 210 may be disposed inside the primary sodium pump tank 202. In some cases, the instrument tank 210 may be inserted through an aperture formed in the PSP flange 802 and thereby be inserted inside the PSP instrument tank 202. An internal bypass 206 may extend from the PSP discharge upwardly while remaining inside the PSP tank 202 where it may couple to the instrument module connection 304, as described herein.

As shown in the illustrated embodiment, the instrument module 302 is disposed inside the PSP tank 202, yet can be accessed from above the reactor head 208 such as for servicing, swapping instrument modules 302, or replacing components. The instrument module 302 can be withdrawn, such as by a crane, by lifting the instrument module 302 out of the PSP tank 202. Any suitable module can be inserted in the illustrated location, and various instrument modules 302 may be inserted for multiple purposes. In some cases, a plurality of instrument modules may be installed into the PSP tank 202 simultaneously, such as by providing multiple apertures in the PSP flange 802 configured to accept instrument modules 302.

In alternative arrangements, the bypass pipe 206 may extend beyond the reactor head 208 to a location above the reactor head 208 and the instrument module 302 may be located on top of the PSP flange 802. In this example, the instrument module is disposed outside of the reactor vessel, which makes accessing the instrument module, such as for repair, replacement, swapping instruments efficient.

Figure 9:
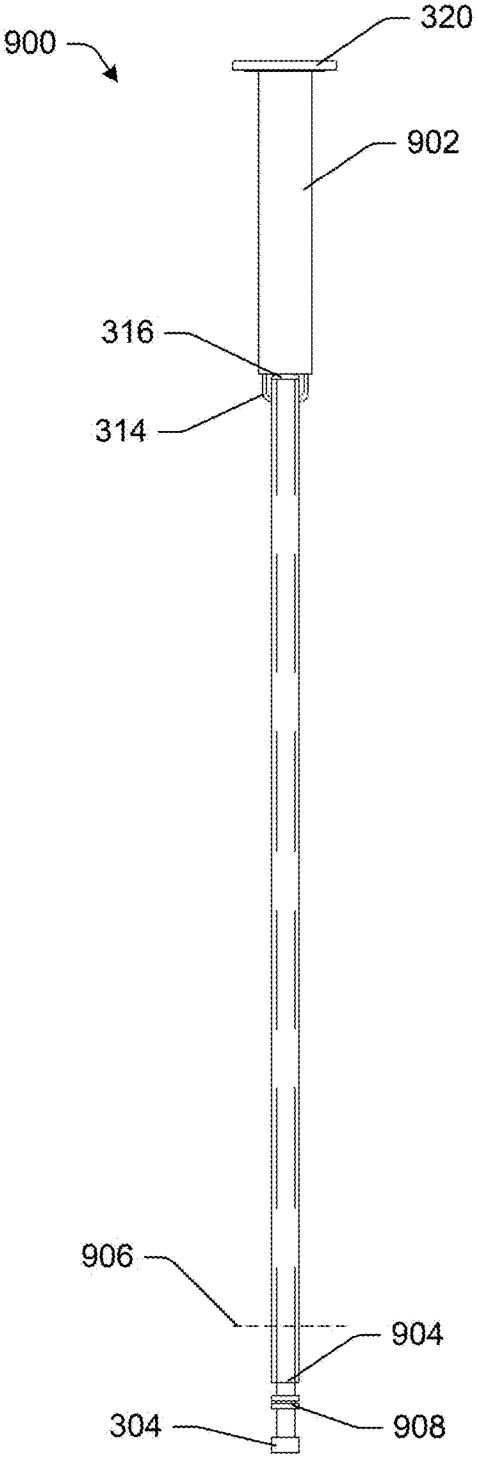
FIG. 9 is a schematic illustration of a PSP instrument module that can be primed and wetted with sodium to create a siphon to maintain the sodium level, in accordance with some embodiments.

FIG. 9 illustrates another embodiment of an instrumentation module 900 that relies on priming with sodium. The instrumentation module 900 may share many components with other embodiments, such as the instrument assembly connection 304 that allows a fluid connection to the bypass pipe from the PSP discharge. A bypass elbow 316 may direct flowing sodium discharged from the instrumentation module 900 back to the instrument tank and the sodium pool. One or more instrument conduits 314 may provide a cable run for connecting instruments to a location above the vessel head through the instrument conduits out aperture.

PSP discharge instruments flange 320 may be disposed at an upper end of the instrumentation module 900 and provide a mount for securing the instrumentation module 900 to the reactor head and/or to the instrument tank. In some examples, the PSP discharge instruments flange 320 is positioned above the reactor head and thus allows access to the instrumentation module 900 from above the reactor vessel.

A drywell shielding 902 may provide a sealed pipe, which may be similar to other reactor instrumentation drywells. In some cases one or more penetrations in the drywell shielding for conduits and/or pressure transmitting capillary lines. In some cases, one or more pressure transmitters, temperature transmitters, and other transmitters may be located within the drywell shielding.

As shown, the bypass elbow 316 and instrumentation is located nearer the reactor head when compared with some other embodiments. For instance, where the instrumentation module 900 has an upper half and a lower half, the instrumentation may be positioned in the upper half of the instrumentation module 900. In some cases, locating the instruments closer to the reactor head is an area within the reactor vessel having a lower temperature than locating the instruments lower in the reactor vessel closer to the reactor core in a bottom portion of the reactor vessel. This location may also reduce the required length for some of the instruments, such as the capillary tube on the pressure instruments.

The bypass pipe may include an inner pipe surrounded by an annular return pipe which may be sealed to the bypass elbow 316. The discharge 904 to the instrument tank is located below a sodium level 906 in the instrument tank. Connections of the temperature and/or pressure instruments may be connected to the inner or outer piping of the bypass pipe. During initial startup of the PSP, slowly ramping up the PSP flow rate would fully wet the bypass and create a siphon within the bypass pipe that will draw sodium into the bypass and even after ramping down the PSP, the bypass would remain filled with sodium due to the sealed connections and sealed space within the bypass.

In some cases, one or more flow restrictors 908 are provided to reduce the sodium flow into the bypass. In some cases, sodium flow into the bypass may cause vibration and fluid velocities into the bypass that are undesirable. The flow restrictor 908 may be used to increase the pressure drop across the bypass, thereby reducing the flow rate. In some cases, the flow restrictor 908 may be welded to the bypass pipe.

As with any of the embodiments described herein, the instrument assembly 302 may be removed as a module from the reactor vessel, such as by withdrawing the entire instrument assembly 302 upward through the reactor head 208 or through the PSP flange 802. The instrument tank may remain permanently installed and provide a conduit for the instrument assembly 302 to be inserted and withdrawn. In some cases, the instrument assembly 302 includes a push on seal that mates with the bypass pipe to allow simple connection and disconnection from the bypass pipe. In some examples, the instrument assemblies can be replaced while the reactor is operating, such as in a low power state. For example, during a refueling operation, one or more instrument assemblies may be withdrawn from the reactor vessel and replaced with another instrument assembly.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may" unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

Unless otherwise noted, the terms "connected to" and "coupled to" (and their derivatives), as used in the specification, are to be construed as permitting both direct and indirect (i.e., via other elements or components) connection. In addition, the terms "a" or "an," as used in the specification, are to be construed as meaning "at least one of." Finally, for ease of use, the terms "including" and "having" (and their derivatives), as used in the The specification and annexed drawings disclose examples of systems, apparatus, devices, and techniques that may provide control and optimization of coolant flow through core assemblies. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive. Although specific terms are employed herein, they are used in a generic and descriptive sense only, and not used for purposes of limitation.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The methods described in relation to embodiments herein may be implemented by one or more processors executing instructions that cause the processors to carry out the disclosed methods.

Throughout the instant specification, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a particular configuration, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system for measuring sodium in a sodium fast reactor, comprising:

a primary sodium pump configured to circulate primary sodium coolant within a reactor vessel, the primary sodium pump having a discharge;

a bypass pipe fluidly coupled to the discharge at a first bypass end and having a second bypass end;

an instrument tank coupled to a reactor head at a first instrument tank end and having a second instrument tank end open to a pool of sodium within the reactor vessel; and an instrument module insertable through an aperture in the reactor head into the instrument tank and selectively coupled to the second bypass end at a coupling, the instrument module comprising one or more instruments configured to measure a characteristic of sodium within the bypass pipe, wherein the coupling is a slip-on coupling with the instrument module fitting over the second bypass end.

2. The system as in claim 1, wherein the instrument module comprises one or more of a temperature sensor, a pressure sensor, a flow sensor, and a fluid level sensor.

3. The system as in claim 2, wherein the pressure sensor includes a low-range pressure sensor, the low-range pressure sensor configured to measure a sodium flow rate at a reactor power of up to 20%.

4. The system as in claim 2, wherein the pressure sensor includes a high-range pressure sensor, the high-range pressure sensor configured to measure a sodium flow rate at a reactor power of greater than 20%.

5. The system as in claim 1, further comprising an annular ridge on an inside surface of the instrument module that seals against an outside surface of the second bypass end.

6. The system as in claim 1, wherein the instrument module comprises a mounting flange at an upper end, the mounting flange configured to mount to the reactor head.

7. The system as in claim 1, wherein the instrument module is removable from the reactor vessel through the aperture in the reactor head.

8. The system as in claim 1, wherein the characteristic of the sodium within the bypass pipe includes one or more of temperature, pressure, flow rate, and fluid level.

9. The system as in claim 1, wherein the bypass pipe is located within the primary sodium pump.

10. The system as in claim 9, wherein the instrument tank is located within the primary sodium pump.

11. The system as in claim 1, wherein the bypass pipe is located outside the primary sodium pump.

12. The system as in claim 1, further comprising a bypass elbow on the instrument module configured to discharge sodium from the instrument module.

13. The system as in claim 1, wherein the instrument module is located within 15 feet of the reactor head.

14. The system as in claim 1, wherein the instrument module is at least partially submerged in sodium.

15. The system as in claim 1, wherein the instrument module is configured to be replaced during reactor operation.

16. A system for measuring sodium in a sodium fast reactor, comprising:

a primary sodium pump configured to circulate primary sodium coolant within a reactor vessel, the primary sodium pump having a discharge;

a bypass pipe located within the primary sodium pump and fluidly coupled to the discharge at a first bypass end and having a second bypass end;

an instrument tank located within the primary sodium pump and coupled to a reactor head at a first instrument tank end and having a second instrument tank end open to a pool of sodium within the reactor vessel; and an instrument module insertable through an aperture in the reactor head into the instrument tank and selectively coupled to the second bypass end at a coupling, the instrument module comprising one or more instruments configured to measure a characteristic of sodium within the bypass pipe.

17. The system as in claim 16, wherein the instrument module is insertable through an aperture formed in a flange of the primary sodium pump.

18. The system as in claim 16, further comprising a bypass elbow on the instrument module configured to discharge sodium from the instrument module, the bypass elbow directing sodium to exit the instrument module and flow within the instrument tank.

19. The system as in claim 16, further comprising one or more flow restrictors on the bypass pipe configured to reduce sodium flow into the bypass pipe.

20. The system as in claim 16, wherein the instrument module is configured to be primed with sodium to create a siphon within the bypass pipe, the siphon configured to maintain a sodium level within the bypass pipe.

* * * * *